US007000298B2

(12) United States Patent
Cook et al.

(10) Patent No.: US 7,000,298 B2
(45) Date of Patent: Feb. 21, 2006

(54) METHOD A QUARTZ SENSOR

(75) Inventors: James D. Cook, Freeport, IL (US);
Cornel P. Cobianu, Bucharest (RO);
Vlad Buiculescu, Bucharest (RO); Ioan Pavelescu, Bucharest (RO); Brian D. Speldrich, Freeport, IL (US); James Z. Liu, Rockford, IL (US); Brian J. Marsh, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 10/828,142

(22) Filed: Apr. 20, 2004

(65) Prior Publication Data
US 2005/0231067 A1 Oct. 20, 2005

(51) Int. Cl.
*H01G 7/00* (2006.01)
*C23F 1/00* (2006.01)

(52) U.S. Cl. ............ 29/25.41; 29/25.35; 29/594; 29/832; 216/2; 310/361

(58) Field of Classification Search .......... 29/25.41, 29/25.35, 594, 832; 73/702, 715, 723, 727; 310/310 B, 310 C, 361, 366; 216/2, 33, 216/41, 75, 100; 438/48, 53, 510–532, 536, 438/553, 700

See application file for complete search history.

(56) References Cited

U.S. PATENT DOCUMENTS

| 4,216,401 A | 8/1980 | Wagner ............... 310/313 R |
| 4,454,440 A | 6/1984 | Cullen ............... 310/313 R |
| 4,771,639 A * | 9/1988 | Saigusa et al. ............... 73/727 |
| 5,461,922 A * | 10/1995 | Koen ............... 73/756 |
| 5,471,723 A | 12/1995 | Luder et al. ............... 29/25.41 |
| 5,686,779 A * | 11/1997 | Vig ............... 310/366 |
| 5,821,425 A | 10/1998 | Mariani et al. ............... 73/703 |
| 5,852,320 A * | 12/1998 | Ichihashi ............... 257/419 |
| 6,079,276 A | 6/2000 | Frick et al. ............... 73/718 |
| 6,374,678 B1 | 4/2002 | Masuda ............... 73/706 |
| 6,484,585 B1 | 11/2002 | Sittler et al. ............... 73/718 |
| 6,541,893 B1 | 4/2003 | Zhu et al. ............... 310/313 |
| 6,550,337 B1 | 4/2003 | Wagner et al. ............... 73/715 |
| 6,571,638 B1 | 6/2003 | Hines et al. ............... 73/702 |

FOREIGN PATENT DOCUMENTS

WO WO 03/081195 A1 10/2003

* cited by examiner

*Primary Examiner*—A. Dexter Tugbang

(74) *Attorney, Agent, or Firm*—Kris T. Fredrick; Kermit D. Lopez; Luis M. Ortiz

(57) ABSTRACT

A quartz sensor method and system are disclosed in which a plurality of SAW sensing resonators can be mechanically simulated for implementation upon a quartz wafer substrate. The quartz wafer substrate can thereafter be appropriately etched to produce a quartz diaphragm from the quartz wafer substrate. A plurality of SAW sensing resonators (e.g., pressure, reference and/or temperature SAW resonators) can then be located upon the quartz wafer substrate, which is based upon the previously mechanically simulated for implementation upon the substrate to thereby produce a quartz sensor package from the quartz wafer substrate.

13 Claims, 15 Drawing Sheets

METHOD A QUARTZ SENSOR

TECHNICAL FIELD

Embodiments are generally related to sensing methods and systems. Embodiments are also related to pressure and temperature sensors. Embodiments are additionally related to surface acoustic wave (SAW) devices and sensors.

BACKGROUND OF THE INVENTION

Pressure sensors are utilized whenever the need to monitor pressure is necessary. Such devices are ideally suited for applications such as tire pressure sensing. It is believed that pressure sensors can be implemented by locating surface acoustic wave (SAW) device on an etched diaphragm within a piezoelectric material such as quartz. To date, however, technological hurdles have prevented such devices from being effectively implemented. Currently, a strong demand exists to utilize pressure and temperature sensors in harsh environments or in association with rotating parts, as in the case of tire pressure monitoring applications. Attempts have been made to implement pressure sensing devices. Existing designs require large substrate and circuit sizes, and also expensive calibration processes during production.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide improved sensor-based methods and systems.

It is another aspect of the present invention to provide for an improved SAW sensor-based methods and systems.

It is yet a further aspect of the present invention to provide improved quartz SAW sensor-based methods and systems.

The aforementioned aspects of the invention and other objectives and advantages can now be achieved as described herein. Quartz sensor-based methods and systems are disclosed in which a plurality of sensing membranes can be mechanically simulated for implementation upon a quartz wafer substrate. The quartz wafer substrate can then be appropriately etched to produce a quartz diaphragm from the quartz wafer substrate. A plurality of sensing elements and devices (e.g., pressure, reference and/or temperature SAW resonators) can then be located upon the quartz wafer substrate, which is based upon the previously simulated sensing membranes for implementation upon the substrate to thereby produce a quartz sensor package from the quartz wafer substrate.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Embodiments disclosed herein generally describe a methodology for the mechanical design of an etched quartz diagram for pressure sensing and techniques for deep quartz etching, direct quart-to-quartz packaging, and metal connections, which protrude external to the quartz cage. Thus, a new methodology and system for SAW sensor interrogation is described herein with respect to varying embodiments of the present invention. Such concepts can be applied to sensing configurations based on an implementation of a plurality of SAW resonators.

One of these SAW resonators can be at least partially on a pressure sensing diaphragm (i.e., referred to as a "Pres-SAW"). The remaining resonators (i.e., Ref-SAW and T-SAW) can be located in a stress-free zone. The pressure can be measured differentially utilizing the P-SAW and Ref SAW sensor, while the temperature can be measured in a differential manner utilizing Ref-SAW and T-SAW sensors located on the stress free region. In the case of temperature measurement, the anisotropy of temperature coefficient of phase velocity and the temperature coefficient of frequency can be speculated for temperature measurement on a quartz substrate. An optimum tilting of a T-SAW resonator with respect to SAW propagation direction of other SAW sensors can be preferably implemented for each type of quartz utilized.

Prior to the design and fabrication of a wireless and/or passive quartz-based SAW sensor for temperature and pressure measurement, a mechanical simulation of strain regimes on the diaphragms should be performed, in order to ensure that a reliable and elastic behavior of the quartz SAW sensor can be performed during an entire range of pressure and temperature operations.

Depending upon the pressure range to be measured, the quartz diaphragm deflecting under pressure can be configured either from a thinner quartz wafer (i.e., without any etched regions) supported at the edges by another quartz wafer utilized for packaging and overpressure stops, or by selectively etching selectively the quartz in order to obtain an etched quartz pressure sensing diaphragm. A quartz diaphragm performed by wet and/or dry quartz etching can be configured for smaller pressure measurements. In general, an analytical simulation of mechanical behavior of a quartz diaphragm can provide a variety of results, which are generally depicted herein with respect to the embodiments of FIGS. 1–9.

Figure 1:
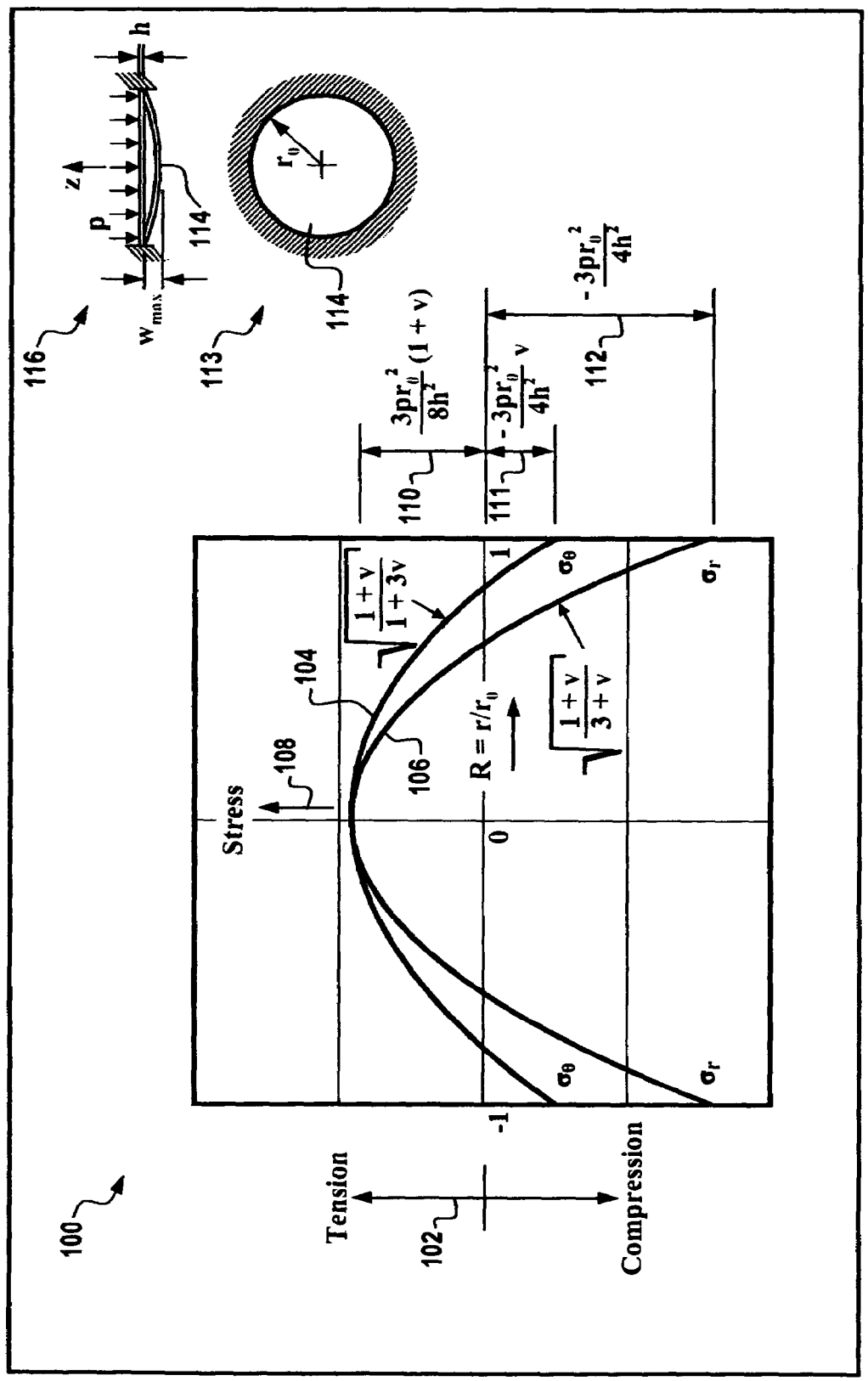
FIG. 1 illustrates a graph depicting the qualitative representation of the stresses in a circular flat plate with a clamped external edge under uniformly distributed pressure loading, which can be utilized as a basis for providing theoretical support for an embodiment of the present invention.

FIG. 1 illustrates a graph 100 depicting the qualitative representation of stresses in a circular flat plate with a clamped external edge under a uniformly distributed pressure load, p (N/m$^2$). The result is derived from the theory of large plates (i.e., the plate thickness is about ten times smaller that the minimum opening of the diaphragm—the diameter in the case of a circular plate) with small deflections (i.e., the maximum deflection is approximately five times smaller that the diaphragm thickness) . . . Graph 100 indicates the radial distribution of normalized tensile and compressive stresses as indicated by arrow 102. Stress is generally indicated by axis 108. Plots 104 and 106 indicate the variation of the induced tangential and radial stresses on the diaphragm by a uniformly distributed pressure load respectively, while the arrows 110, 111 and 112 indicate the normalized expressions for such stresses in the center of the diaphragm and at the clamped diaphragm edges.

An insert 113 is also depicted in FIG. 1, in association with graph 100, and represents a clamped diaphragm, i.e. a circular flat plate 114 bonded by a rim. The uniformly distributed pressure upon the circular flat plate 114 is generally indicated by a plurality of arrows in the insert 116, which is also depicted in FIG. 1. Note that the same inserts 113 and 116 are also shown in FIGS. 2–5 herein. In general, graph 100 of FIG. 1 depicts stress distribution on the diaphragm 114 as a function of normalized distance (r/r$_o$) from the center of diaphragm 114.

Figure 2:
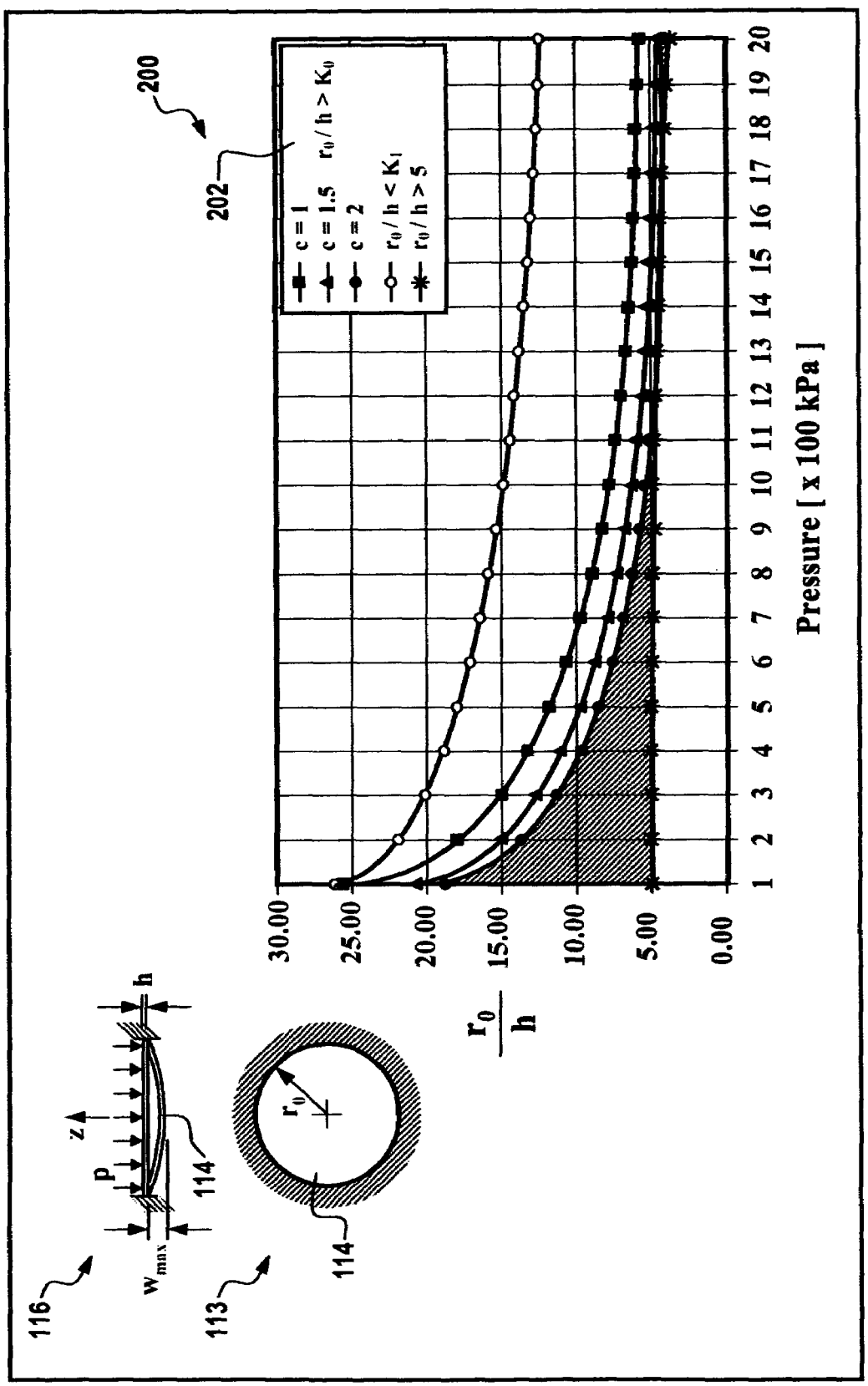
FIG. 2 illustrates a graph depicting a permissible range of elastic deformation of a quartz diaphragm expressed in terms of quartz diaphragm radius/diaphragm thickness versus pressure with a safety coefficient, c, as a parameter, which can be utilized as a basis for providing theoretical support for an embodiment of the present invention.

FIG. 2 illustrates a graph 200 depicting a permissible range of elastic deformation of a quartz diaphragm expressed in terms of quartz diaphragm radius/diaphragm thickness versus pressure. Such a configuration is also derived from the theory of large plates with small deflections and from conditions for maintaining the deformation in an elastic range (i.e., the maximum induced stress—which is the radial stress at the clamped edge—is "c" times smaller that the elastic/fracture limit of the diaphragm material, "c" being a safety coefficient, usually between 1 and 3).

Graph 200 generally depicts a range of permissible values of the ratio r$_o$/h versus the maximum pressure applied to the plate 114, the elastic deformation being conditioned by a maximum stress, $\sigma_{elastic/fracture}$=50 MPa. Graph 200 thus indicates that the maximum radius of the diaphragm 114 can be extracted and utilized for a particular diaphragm thickness, so that an elastic behavior of the diaphragm 114 can be obtained for a certain pressure and a safety coefficient.

Figure 3:
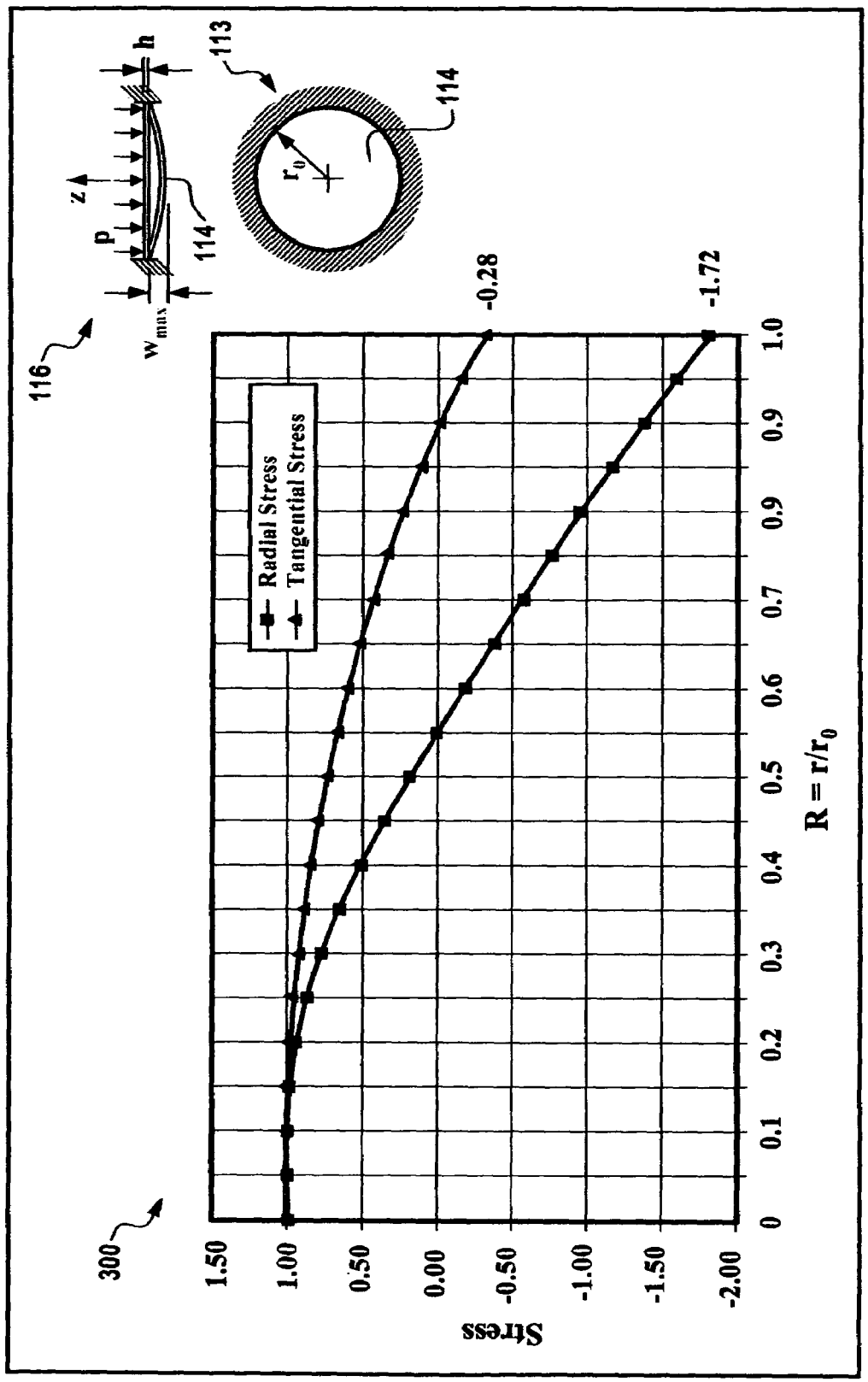
FIG. 3 illustrates a graph depicting the detailed dependence of normalized radial and tangential stresses versus normalized distance from the diaphragm center to the rim, which can be utilized as a basis for providing theoretical support for an embodiment of the present invention.

FIG. 3 illustrates a graph 300 depicting the detailed dependence of normalized radial and tangential stresses versus normalized distance from the center of diaphragm 114 to the rim of diaphragm 114 derived from the theory of circular plates with small deflections. Graph 300 generally describes the normalized radial and tangential stresses (i.e., $\sigma_{r,\theta}/\sigma_o$, where the variable $\sigma_o$ represents the stress at the center of the diaphragm) for a quartz circular plate, such as plate 114, associated with a clamped diaphragm. The results indicated by graph 300 of FIG. 3 are generally preferred for the estimation of the acoustic sensitivity of SAW devices.

Figure 4:
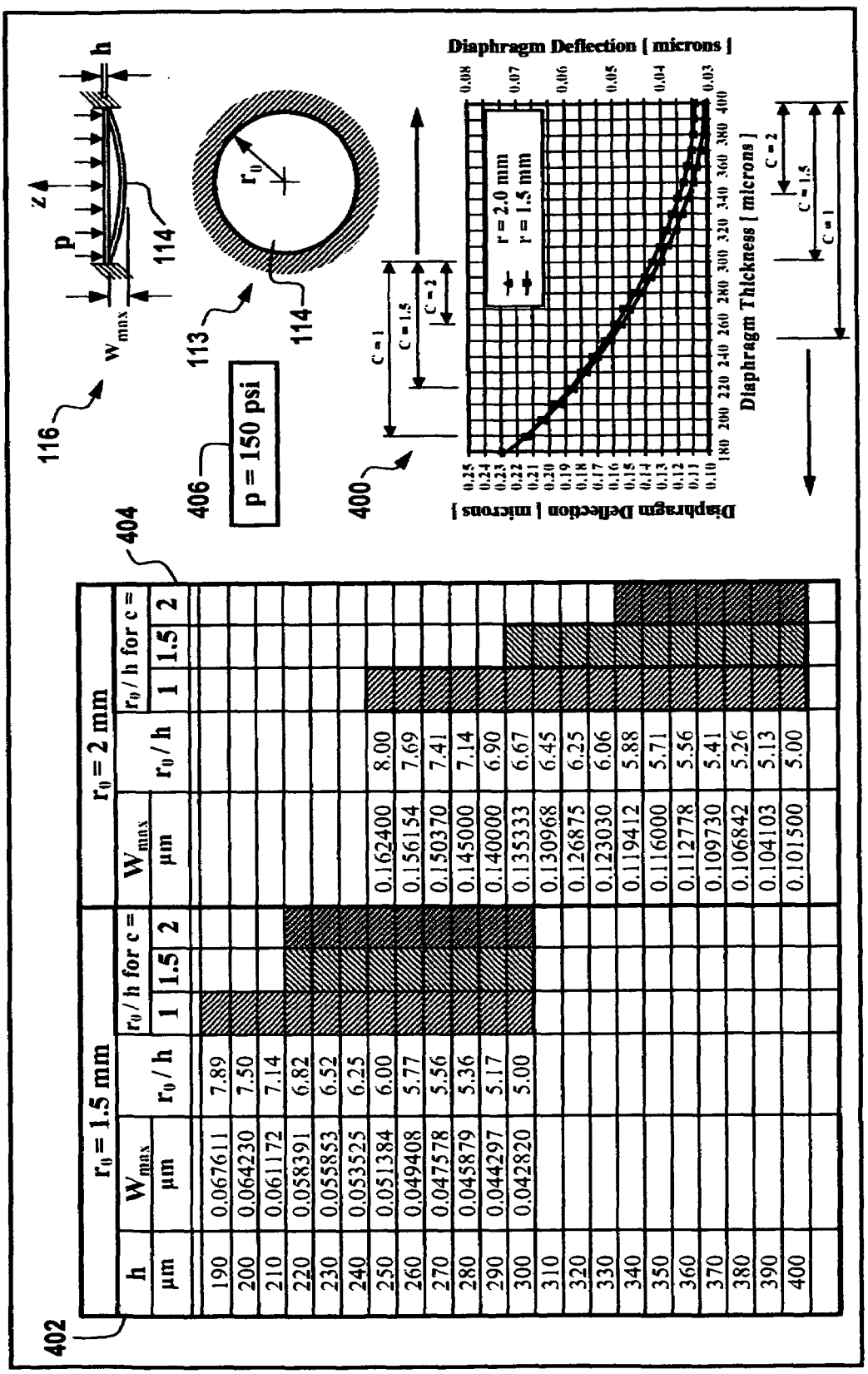
FIG. 4 illustrates a graph and associated tables describing the maximum deflection of the quartz diaphragm as a function of diaphragm thickness, which can be utilized as a basis for providing theoretical support for an embodiment of the present invention.
Figure 5:
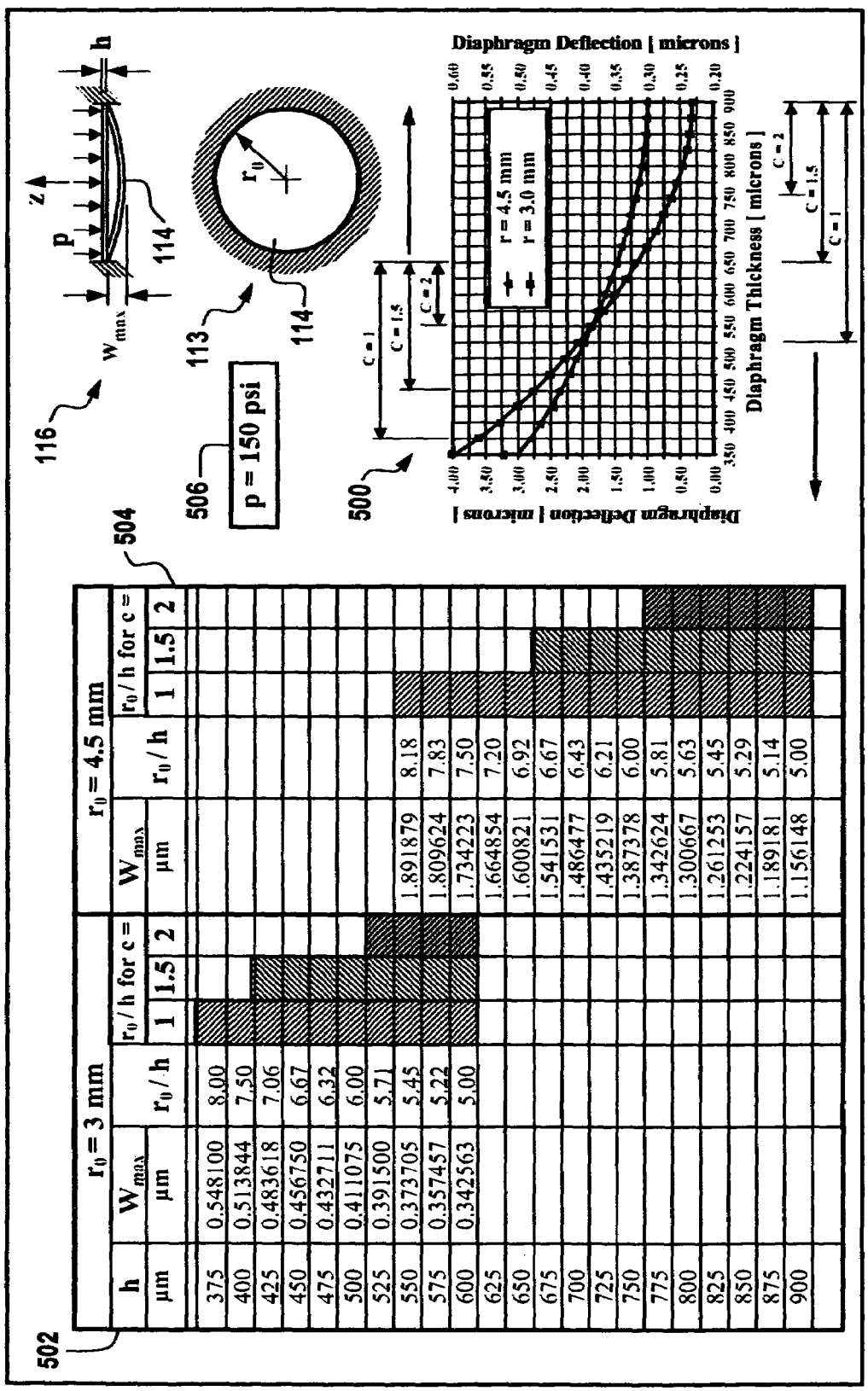
FIG. 5 illustrates a graph and associated tables describing the maximum deflection of the quartz diaphragm as a function of diaphragm thickness, which can be utilized as a basis for providing theoretical support for an embodiment of the present invention.

FIGS. 4 and 5 illustrate graphs 400 and 500, and associated tables 402, 404, and 502, 504, which describe the maximum deflection of the quartz diaphragm as a function of diaphragm thickness, derived from the theory of large plates with small deflections and from the condition to maintain the deformation in the elastic range. Graphs 400 and 500 of FIGS. 4 and 5 and respective tables 402, 404 and 502, 504 generally provide the maximum deflection of the quartz diaphragm 114 as a function of diaphragm thickness, at a pressure of 150 psi for different values of diaphragm radius and safety coefficient. Graphs 400 and 500 of FIGS. 4 and 5 and respective tables 402, 404 and 502, 504 can be interpreted as suppliers of the permissible range of the diaphragm thickness for a given pressure loading and different values of diaphragm thickness and safety coefficient. Such results are useful for the calculation of the geometrical characteristics of the circular diaphragm and the overpressure stops, and for the design of all quartz packaging technology.

The mechanical analytical simulation of the stresses (i.e., see FIGS. 1 and 3) demonstrates that for a circular diaphragm of radius r$_o$, a tensile (i.e., + sign) central region with a radius r of approximately 0.6 r$_o$ can be obtained, while the remaining part of diaphragm 114 to the rim thereof (i.e., width of 0.4 r$_o$) will be compressed (i.e., − sign). The radial and tangential tensile stresses are maximum in the center of the diaphragm 114, and decrease to zero at r=0.55 $r_o$ for radial stress and r=0.9 $r_o$ for tangential stress, respectively. For r>0.55 $r_o$, the radial stress becomes negative, while the tangential stress becomes negative for r>0.9 $r_o$, the maximum compression being obtained for both stress types at the edge of diaphragm 114.

The radial and tangential strains obtained from the analytical simulation are very important for estimation of the acoustic sensitivity of SAW-resonators located on diaphragm 114. The combination between radial and tangential stresses is responsible for acoustic sensitivity of the SAW devices. Such a result, which can be proved by experimental validation during optimization of all quartz packaging of SAW oscillators is essential for the sensitivity, design and location of the SAW resonator on the diaphragm. Such results are also essential for packaging technology in order to obtain stress free sealing thereof. The location of three SAW resonator sensors for measuring pressure and temperature can be accomplished utilizing a variety of configurations, depending upon the sensitivity level desired by the designer.

Figure 6:
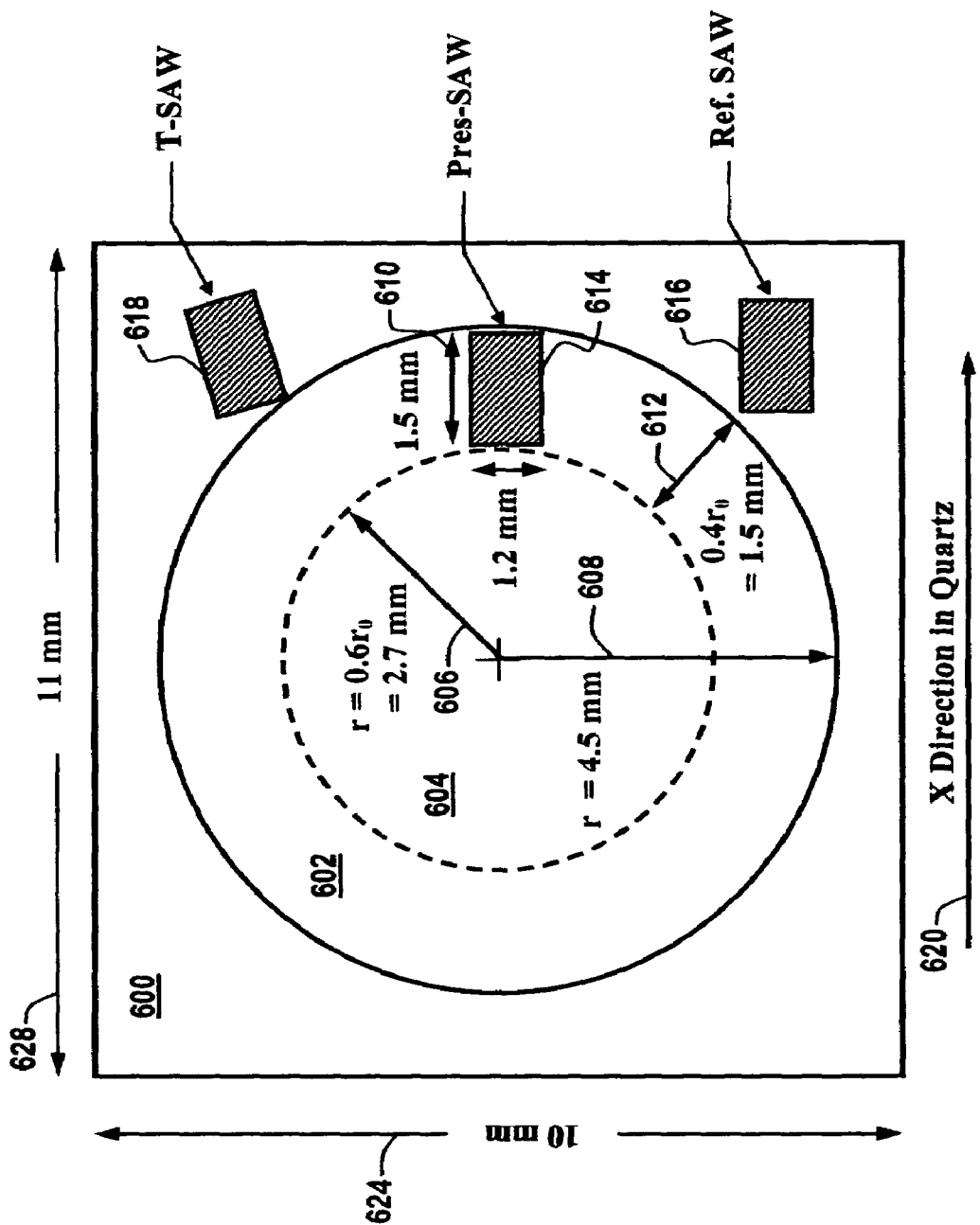
FIG. 6 illustrates a block diagram of three SAW-resonators configured upon a quartz chip, which can be utilized as a basis for providing theoretical support for an embodiment of the present invention.

FIG. 6 illustrates a block diagram of three SAW-resonators 618, 614, and 616 configured upon a quartz chip 600, in accordance with one embodiment of the present invention. In the embodiment depicted in FIG. 6, the SAW resonator 614 (i.e., Pres-SAW) can be located on quartz chip 600 closer to the rim, so that it is exposed to a compressive stress. In this manner, the entire sensor can "see" only a compressed zone. The reference SAW resonator 616 (i.e., Ref. SAW) can be located outside the can be measured by determining the frequency difference between SAW resonator 614 and SAW resonator 616.

Similarly, the temperature can be measured in a differential manner, wherein both SAW sensors (i.e., T-SAW and Ref. SAW) are located in the stress free zone. In the configuration of FIG. 6, the temperature can be obtained from the frequency difference between SAW resonator 618 (i.e., T-SAW) and SAW resonator 616 (i.e., Ref. SAW). This manner of location for the three SAW resonators is an essential improvement for the elimination of temperature influence on pressure measurement and reciprocally. In FIG. 6, a radius r of area 604 approximately equals 0.6 $r_o$, which is approximately equivalent to 2.7 mm, as indicated by arrow 606. Arrow 608 indicates a radius $r_o$ of approximately 4.5 mm. Arrow 612 indicates that 0.4 $r_o$ is approximately equivalent to 1.8 mm, while arrow 610 indicates a length of Pres-SAW resonator 614 of approximately 1.5 mm. Arrows 628 and 624 indicate the dimensions of quartz chip 600 of approximately 11 mm (i.e., the length) and 10 mm (i.e., the width), respectively.

FIG. 6 generally illustrates an example of the mechanical design of a quartz diaphragm for pressure measurement in a range from 0 to 150 psi by considering several assumptions. The first assumption is that the quartz strength is equal to 50 MPa (tensile stress), which represents the worst case for the calculation of the elastic limit of the quartz diaphragm. The second assumption is that the safety coefficient, c, is equal to 1.5 The third assumption is that the SAW resonator 614 (i.e., Pres-SAW) is located inside the compressed area of the circular diaphragm 602 closed to the rim thereof and occupying along the radius a length L of about 0.33 $r_o$, which represents approximately 1.5 mm. This value results from an operating frequency of 915 MHz, and a frequency bandwidth from the license free domain. The fourth assumption is based on the idea of obtaining a high value for the pressure sensitivity. This assumption can be realized by optimization of the combination of radial and tangential stresses, which is possible in the compressed region of the diaphragm.

For a maximum pressure of 150 psi to be measured in association with the aforementioned assumptions, the simulation results provide the radius of the diaphragm, $r_0$, approximately equal to 4.5 mm, as indicated by arrow 608 in FIG. 6. For a safety factor of c=1.5, the ratio between the diaphragm radius and the thickness of the diaphragm is less than 6.67. Such a configuration provides a quartz diaphragm thickness of 675 micrometers. One advantage of such a solution include the fact that the location of SAW resonator 614 (i.e. Pres-SAW) is entire within a compressive area, wherein a high pressure sensitivity results. Another advantage is that SAW resonator 616 (i.e., Ref. SAW) and SAW resonator 618 (i.e., T-SAW) are located on a stress free area, wherein reduced temperature dependence of measured pressure results. Drawbacks of the configuration of FIG. 6 include increased chip size and diaphragm thickness, and long metallization paths. Long metal connections could increase the electrical series resistance of the sensors and may also affect the quality factor (Q) of such devices.

Figure 7:
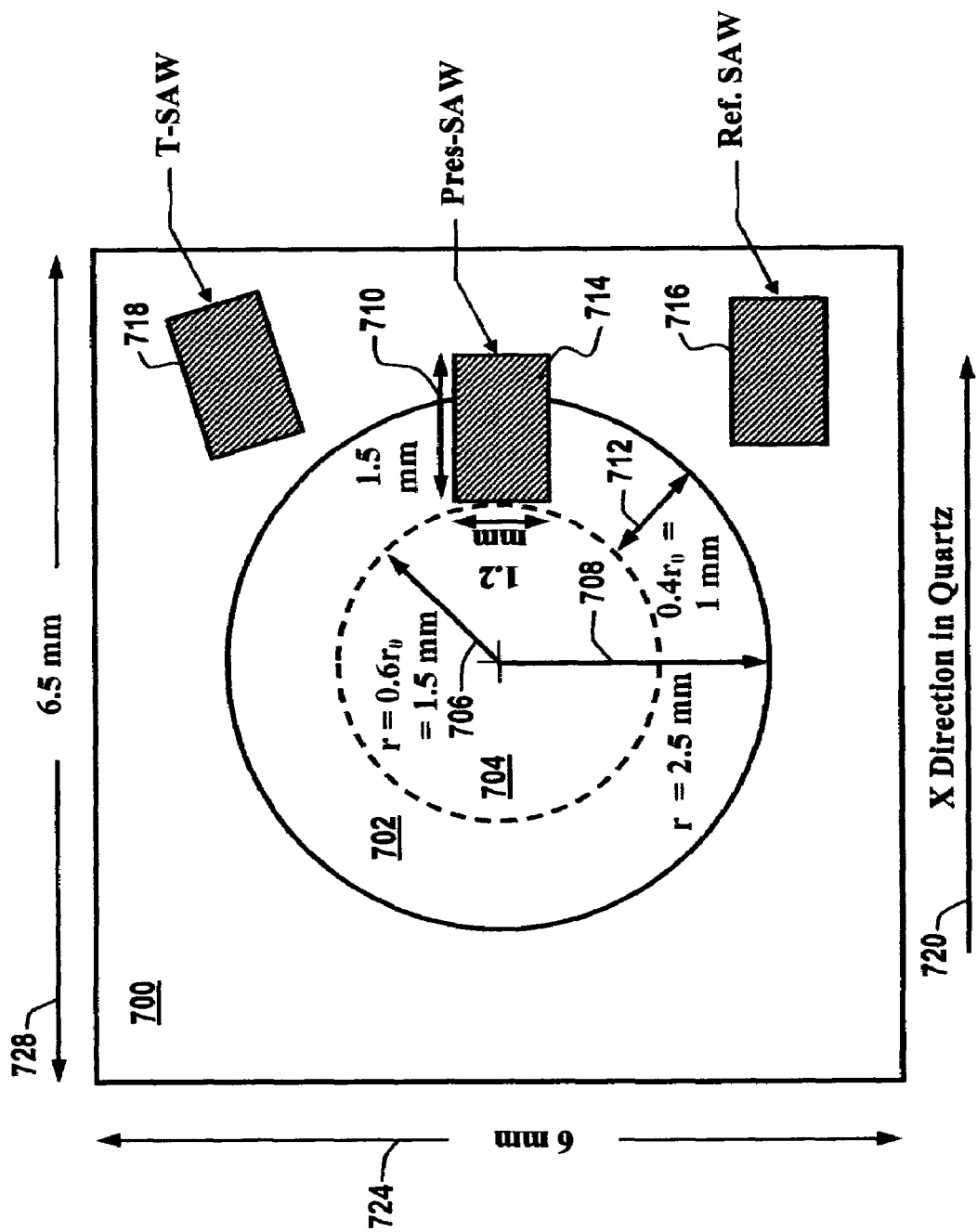
FIG. 7 illustrates a block diagram of the same three SAW-resonators from FIG. 6 with the pressure SAW resonator partially located on the quartz diaphragm with the other two SAW resonators configured in approximately the same locations upon a quartz chip, as in FIG. 6, in accordance with another embodiment of the present invention.

FIG. 7 illustrates an example of a block diagram of the three SAW-resonators depicted in FIG. 6 in association with a pressure SAW resonator 714 (i.e., Pres-SAW sensor), which is partially located on the quartz diaphragm 702. Two other SAW sensors 718 and 716 can be configured in approximately the same locations upon a quartz chip, as depicted in FIG. 6, in accordance with an alternative embodiment of the present invention. In the configuration depicted in FIG. 7, one group of reflectors of P-SAW sensor can be located on the stress free area.

In the example of FIG. 7, a radius r of area 704 approximately equals 0.6 $r_o$, which is approximately equivalent to 1.5 mm, as indicated by arrow 706. Arrow 708 indicates a radius $r_o$ of approximately 2.5 mm. Arrow 712 indicates that 0.4 $r_o$ is approximately equivalent to 1 mm, while arrow 710 indicates a length of Pres-SAW resonator 714 of approximately 1.5 mm. Arrows 728 and 724 respectively indicate that the dimensions of quartz chip 700 are approximately 6.5 mm (i.e., the length) and 6 mm (i.e. the width).

An advantage of the configuration depicted in FIG. 7 is that the SAW resonator 716 (i.e., Ref SAW) and SAW resonator 718 (i.e., T-SAW) are located on the stress free area. Another advantage is a reduced temperature dependence of measured pressure and reduced chip size, particularly with respect to the example depicted in FIG. 6. A disadvantage of the configuration of FIG. 7 is the partial location of SAW resonator 714 (i.e., Pres-SAW) on the compressive area, which is indicated by arrow 710, wherein reduced pressure sensitivity may result, particularly with respect to the configuration depicted in FIG. 6. Other disadvantages of the configuration of FIG. 7 include long metallization paths.

Figure 8:
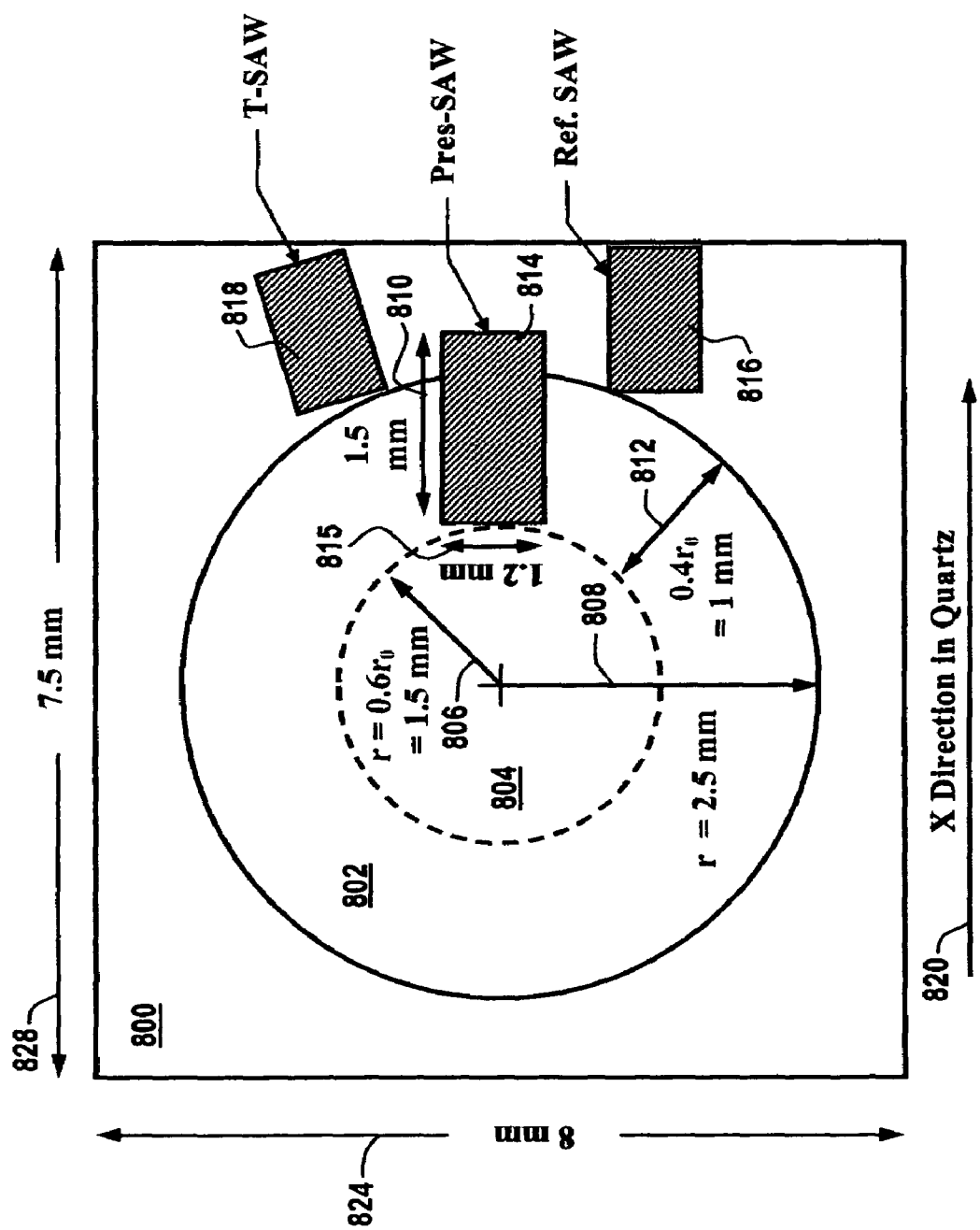
FIG. 8 illustrates a block diagram of the three SAW-resonators depicted in FIG. 6 wherein the pressure SAW resonator is partially located on a quartz diaphragm such that the other two SAW resonators are configured in a more compacted arrangement, in accordance with an alternative embodiment of the present invention.

FIG. 8 illustrates a block diagram of the three SAW-resonators depicted FIG. 6 in association with a pressure SAW resonator 814, which is partially located on a quartz diaphragm 802, along with two other SAW resonators 816 and 818, which are configured in a more compacted arrangement, in accordance with an alternative embodiment of the present invention. Diaphragm 802, which possesses a radius $r_o$ of 2.5 mm as indicated by arrow 808, is generally located on a quartz chip 800, and includes a tensile region 804 with a radius, r=0.6 $r_0$=1.5 mm, as indicated by arrow 806. The width of quartz chip 800 is approximately 6 mm, as indicated by arrow 824, while the length of quartz chip 800 is approximately 7.5 mm, as indicated by arrow 828. Arrow 812 indicates that 0.4 $r_o$=1 mm. The arrows 810 and 815 respectively indicate a length and a width of the Pres-SAW resonator 814, of approximately 1.5 mm and 1.2 mm respectively. SAW resonator 816 can be implemented as a Ref. SAW, while SAW resonator 818 can be implemented as a T-SAW.

Some of the same disadvantages that were present in the configuration of FIG. 7 are also present in the example depicted in FIG. 8. The configuration of FIG. 8, however, presents some advantages, such as a short metal connection between the three SAW resonators (sensors) 818, 814 and 816, which contributes to a low series resistance of metal and thus to a high quality factor.

Figure 9:
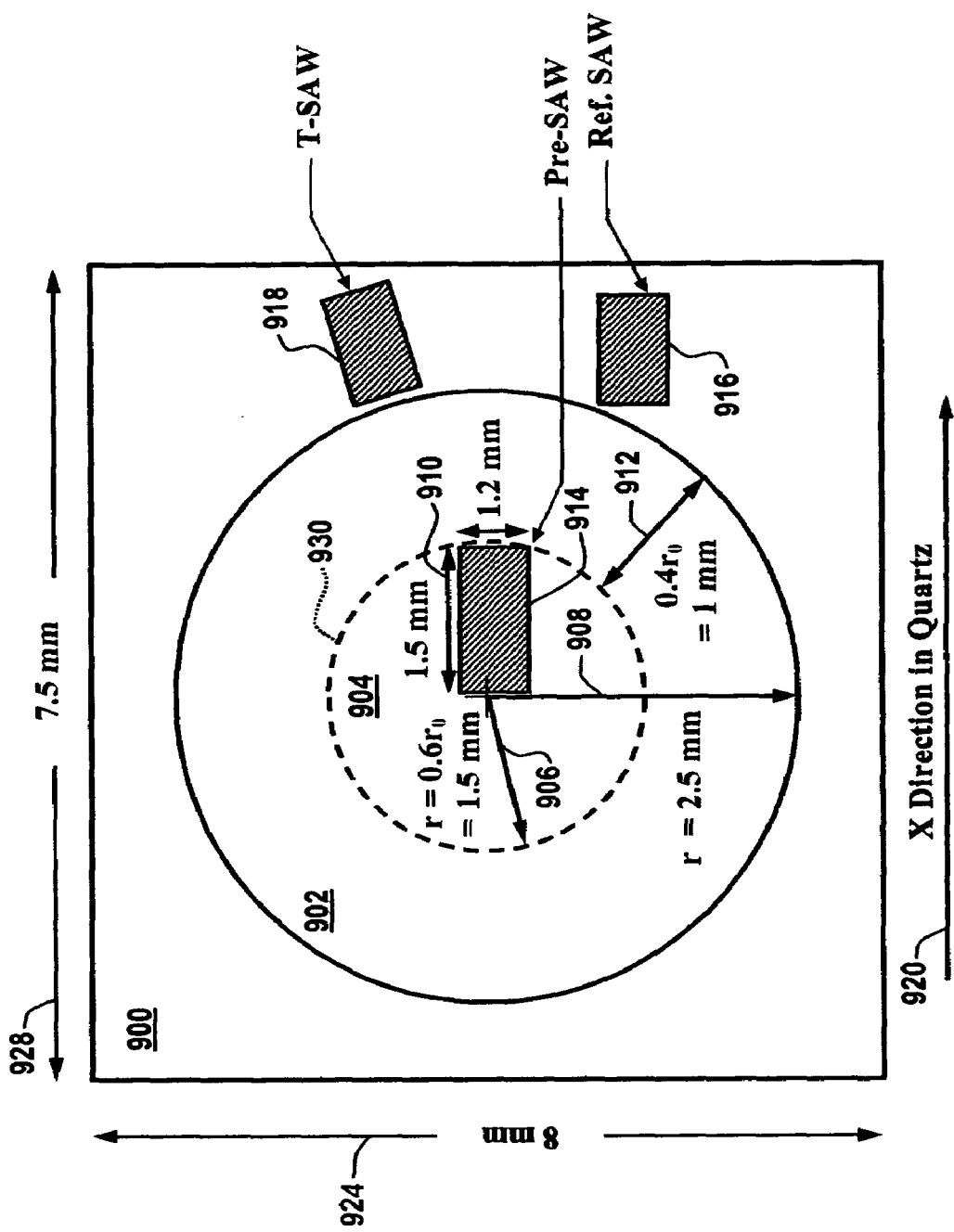
FIG. 9 illustrates a block diagram of the three SAW-resonators depicted in FIG. 6 in association with a pressure SAW resonator integrally located on the tensile stress zone of the quartz diaphragm, along with a T-SAW and a reference SAW located within a stress-free zone, in accordance with an alternative embodiment of the present invention.

FIG. 9 illustrates a block diagram of the three SAW-resonators depicted in FIG. 6 in association with a pressure SAW resonator 914 integrally located on the tensile stress zone of the quartz diaphragm 902, along with a SAW resonator 918 (i.e., T-SAW) and a reference SAW resonator 916 (i.e., Ref. SAW) located within a stress-free zone on quartz chip 900, in accordance with an alternative embodiment of the present invention. In the alternative embodiment depicted in FIG. 9, quartz chip 900 generally has a width of 6 mm as indicated by arrow 924, and a length of 7.5 mm as indicated by arrow 928. Tensile stress region 904 of quartz diaphragm 902 has a radius, r=0.6 $r_o$=1.5 mm as indicated by arrow 906.

The radius $r_o$ of diaphragm 902 is approximately equal to 2.5 mm, as indicated by arrow 908. Arrow 920 represents "X direction in quartz", while arrow 912 indicates a distance of 0.4 $r_o$=1 mm for compressive stress zone of the diaphragm 902. In the configuration depicted in FIG. 9, the SAW resonator 914 (i.e., Pres. SAW) is located entirely within a tensile stress region of r=0.6 $r_o$=1.5 mm, which is indicated generally by arrow 906, starting from the center of diaphragm 902 and to the boundary between the tensile and compressive regions, which is indicated generally by the dashed circular line 930. The other two sensors (i.e., SAW resonators 916 and 918) are located outside diaphragm 902, on a stress-free surface, as close as possible to SAW resonator 914 (i.e., Pres-SAW sensor).

The acoustic sensitivity in this case can be maximized on the diaphragm region close to the boundary (i.e., see dashed line 930) between the tensile and compressive regions. The sensing principle, based on etched quartz diaphragms, has driven a methodology for new generations of high frequency SAW pressure sensors, where both SAW sensor area and diaphragm diameter may be minimized as much as possible. Generally, etched quartz diaphragm fabrication requires high etch rates, but this requirement and the necessity to realize flat etched surfaces are two rather conflicting conditions, which can be fulfilled utilizing optimized high-density plasma etching technology and equipment, where a compromise between etching rates and surface roughness can be effectively made.

Figure 10:
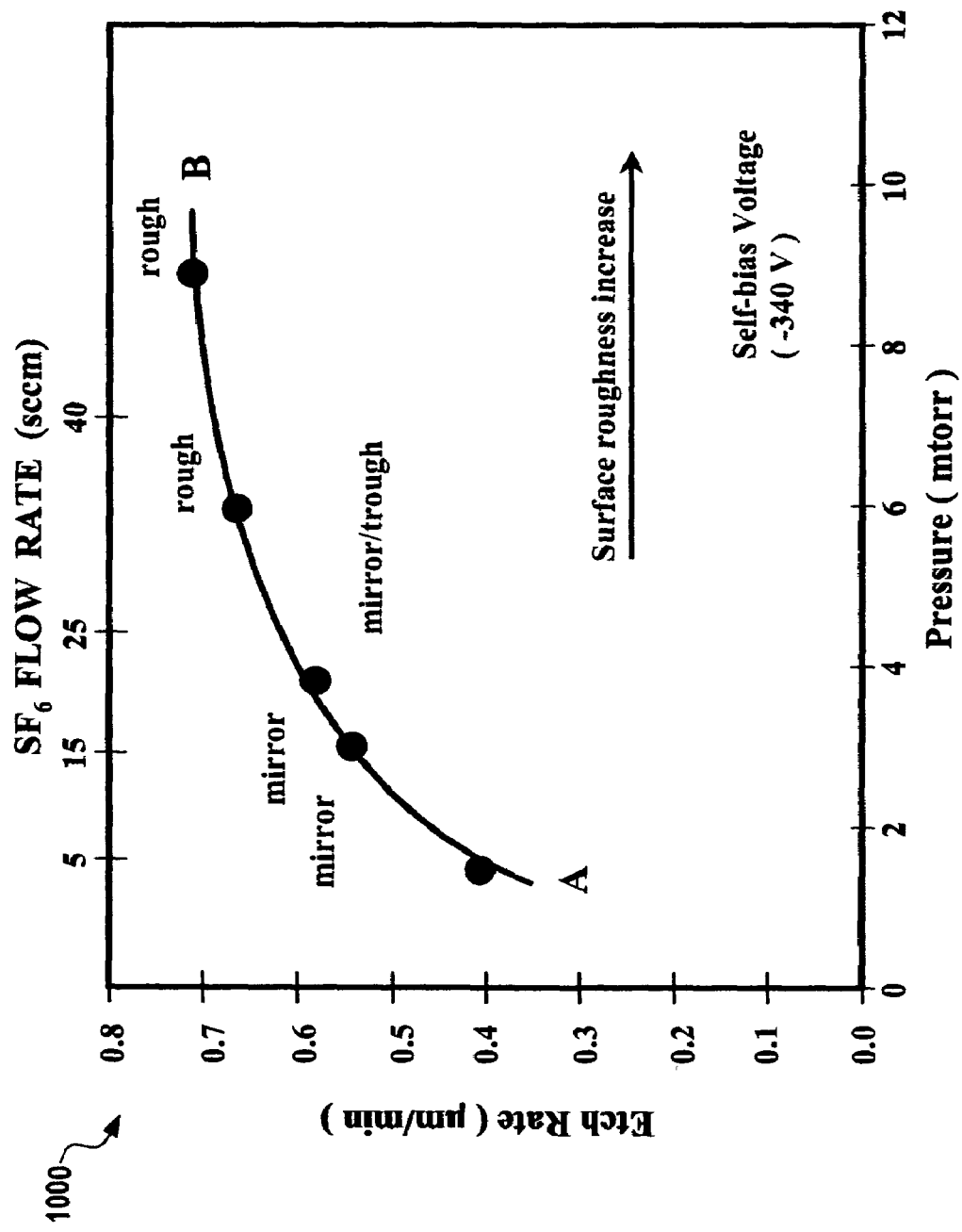
FIG. 10 illustrates a graph of the quartz dry etching rate versus $SF_6$ etching pressure/flow rate, presenting, in the same time, the effect of the etching parameters on quartz surface roughness.
Figure 11:
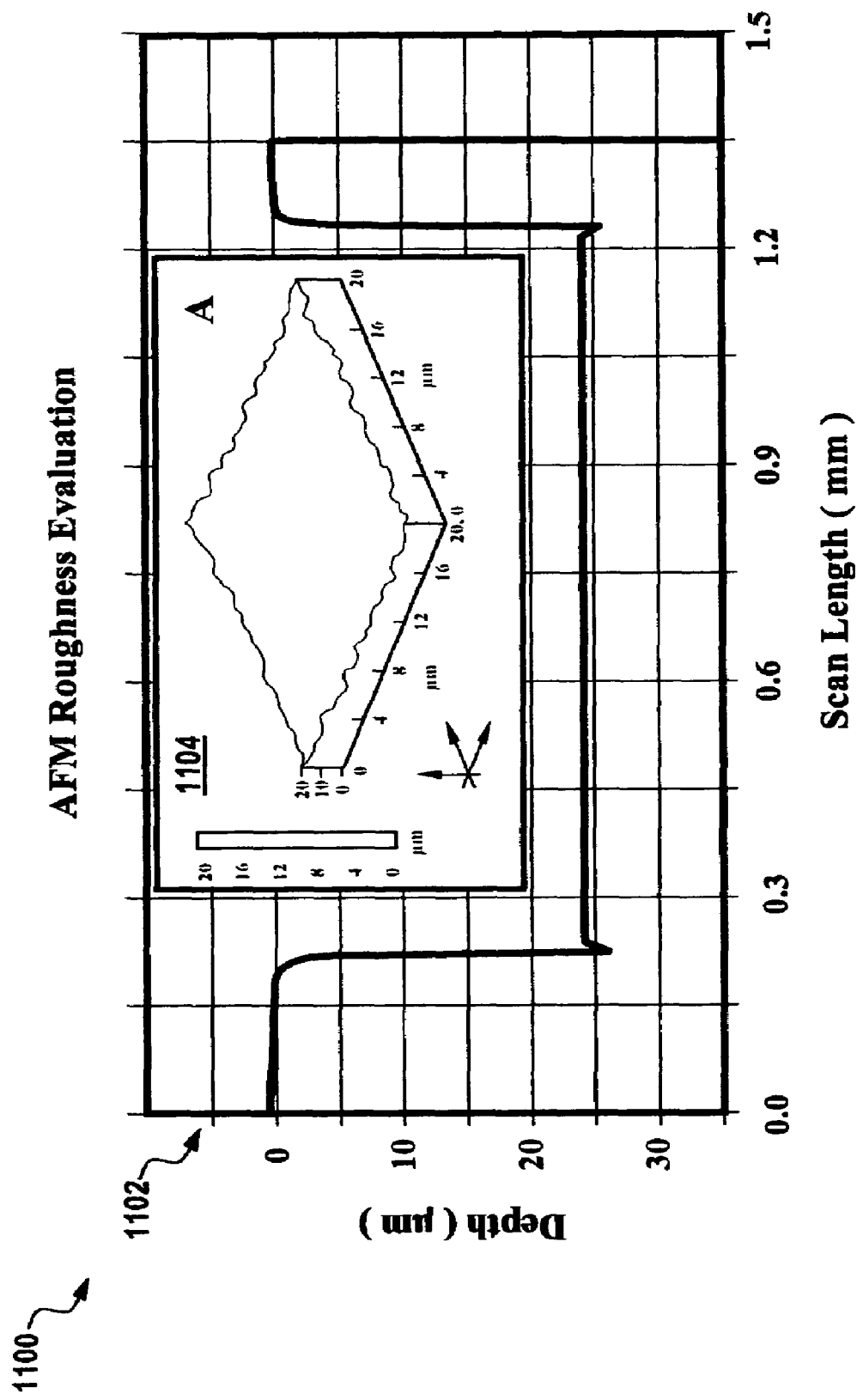
FIG. 11 illustrates graphs generally depicting AFM roughness evaluation.
Figure 12:
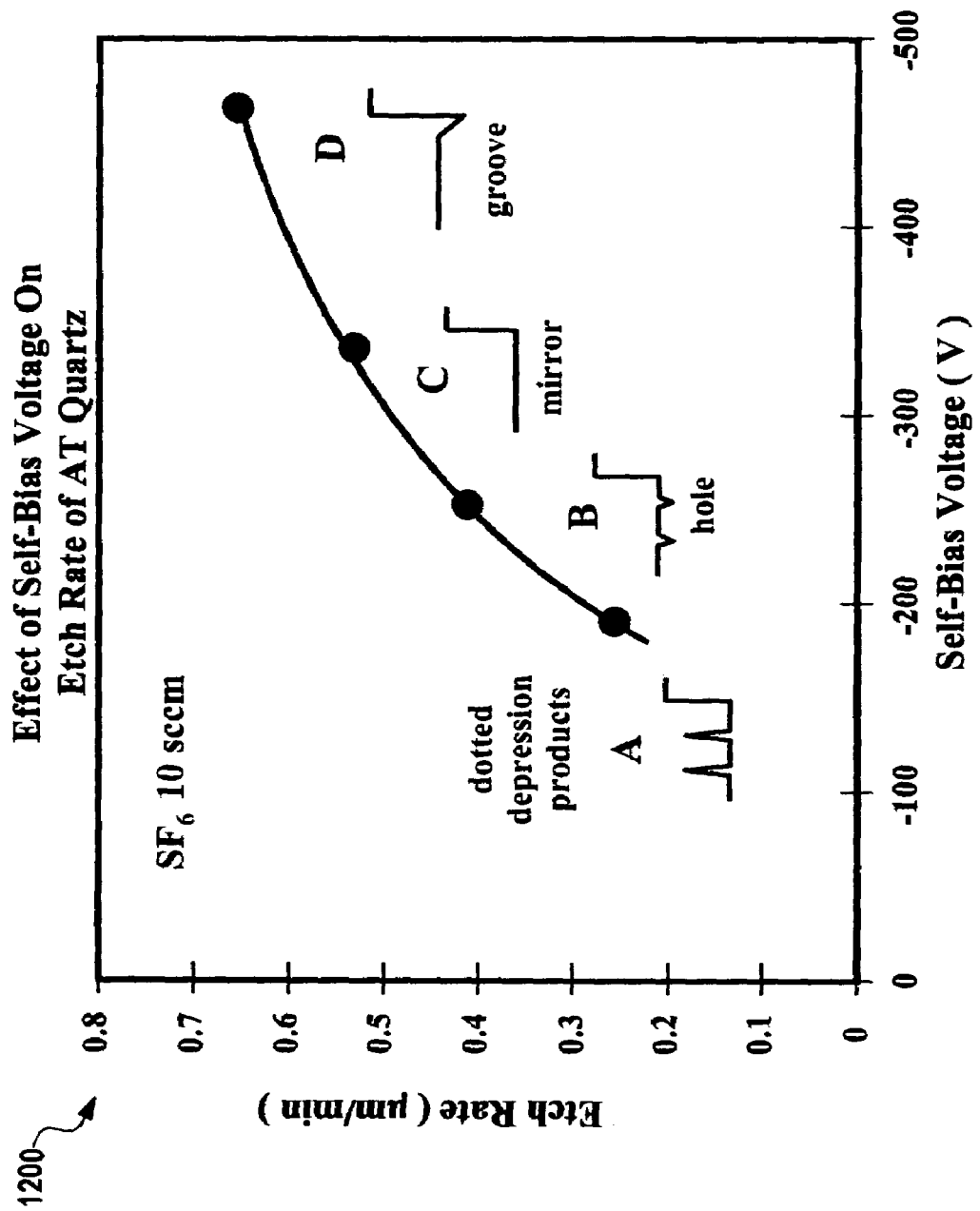
FIG. 12 illustrates a graph generally depicting the effect of self-bias voltage on the etching rate of AT quartz.

Etch rates as high as 0.3 micrometers per minutes and a surface roughness of approximately 2 nm, for example, can be obtained via inductively coupled plasma reactive ion etching (ICP RIE) using $SF_6$ etching gas, low process pressure (e.g., 2 mTorr) and a self-bias voltage (e.g. 340 V). FIGS. 10–12 herein illustrate examples of such parameters, and are presented for general illustrative and contextual purposes only. Additionally, such figures can be utilized as a theoretical support for embodiments disclosed herein. Examples of such parameters are presented in greater detail in non-limiting reference, Abe and Esashi (Sensors & Actuators, A82, 2000, pp. 139–143).

FIG. 10 illustrates a graph 1000 depicting an AT quartz dry etching rate versus $SF_6$ etching pressure/flow rate and simultaneously the effect of the etching parameters on AT quartz surface roughness in ICP-RIE FIG. 11, on the other hand, illustrates a graphical configuration 110, which includes graphs 1104 and 1102 depicting AFM roughness evaluation, wherein the roughness average is generally less than 2 nm. FIG. 12 illustrates a graph 1200 depicting the effect of self-bias voltage on the etch rate of AT quartz and surface quality in ICP RIE.

In general, increasing the frequency of SAW sensor operations can determine a strong reduction of dimensions of SAW devices, while the frequency bandwidth restrictions for preserving operations in the license-free frequency band can be easily fulfilled. The standard technology of SAW filters can also be applied for defining the interdigital transduced (IDT) domain. Because the direct quartz bonding technology requires a very flat surface, the use of metal ion implantation as a method for creating a conductive path inside an all-quartz package to outside bonding pads is preferred. Titanium represents one type of a preferred metal, the energy and dose of titanium implantation being determined by the designed electrical resistivity of the conductive path, as required by the adaptation circuit to sensor antenna.

The selection of materials for packaging and the encapsulation of SAW devices can have a tremendous effect on temperature dependence characteristics and long-term stability, because any thermal stress at the surface of the quartz substrate where the SAW device is located can change the operation frequency. Packaging of SAW pressure sensors is therefore a critical process, similar to that of piezoresistive pressure sensors. In order to avoid thermal stresses due to thermal expansion coefficient mismatch, and to be able to protect the quartz diaphragm by constructing an overpressure stop, a true all-quartz packaging (TAQP) technique can be implemented, in the context of a direct quartz-to-quartz wafer bonding process as follows:

1. Micro-roughness evaluation of as-received quartz wafers (AFM:RMS<1.3 nm);
2. Micro-roughness evaluation of processed quartz cover (wafer level) and quartz SAW substrate (wafer level) (AFM: RMS<1.3 nm);
3. Hydrophilisation treatment of quartz cover and quartz SAW substrate in boiled, concentrated $HNO_3$ for 30–50 minutes (i.e., generally, the RMS decreases after this treatment);
4. Rinsing in DI water followed by drying;
5. Cleaning in Megasonic RCA 1 solution ($NH_4OH:H_2O_2$: $H_2O$=1:1:5) for 10 minutes, followed by $HCl:H_2O_2$: $H_2O$=1:1:6 for 10 minutes;
6. Drying of both quartz cover and quartz SAW substrate;
7. Immediate contact and alignment of cover and SAW substrate;
8. Thermal annealing in $N_2$ for 1 hour at a temperature T<450° C. (i.e., temperature should be ramped up and down at approximately 10° C./min); and
9. Bonding control, wherein the "crack opening" method is utilized by means of a 50 nm thin blade.

Figure 13:
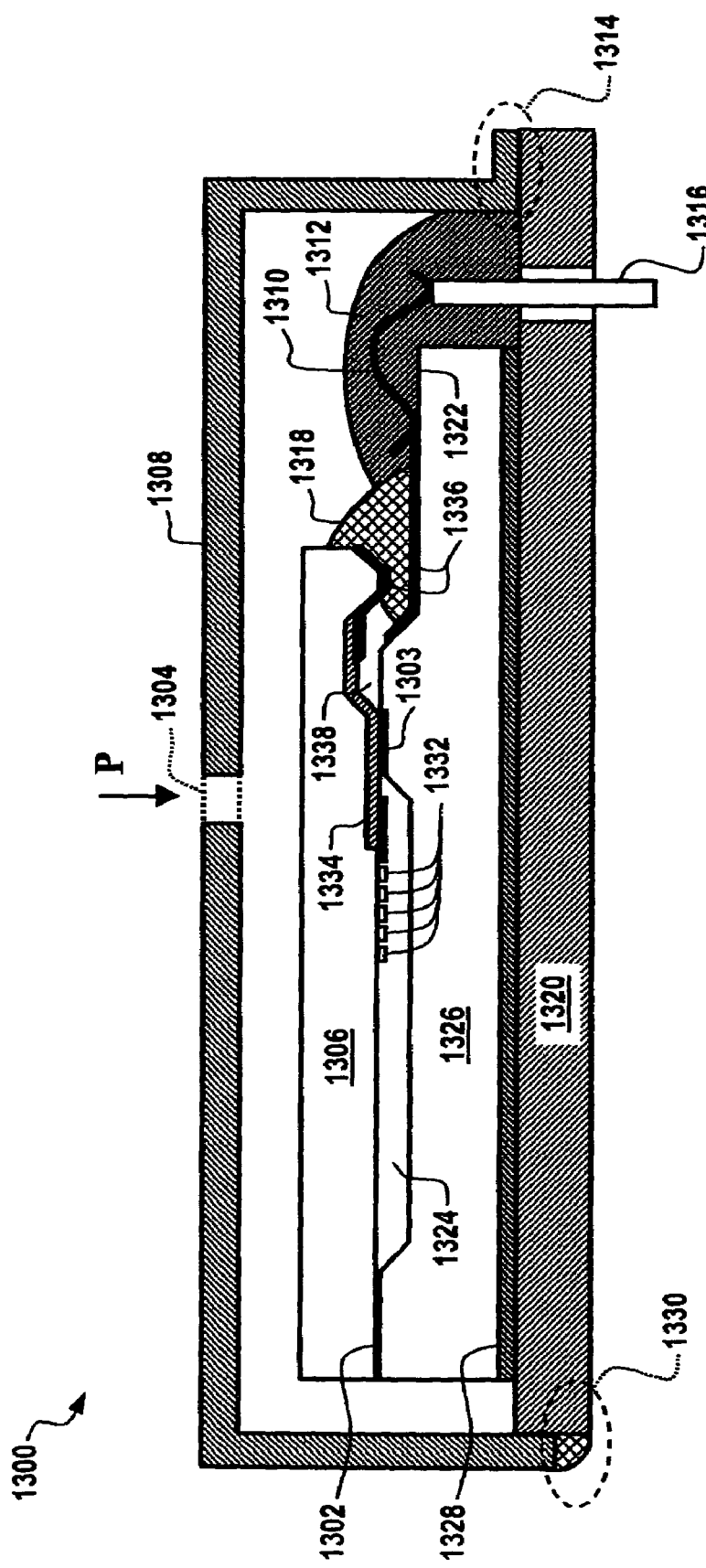
FIG. 13 illustrates a cross-sectional view of a quartz packaged SAW pressure sensor, in accordance with one embodiment of the present invention.
Figure 14:
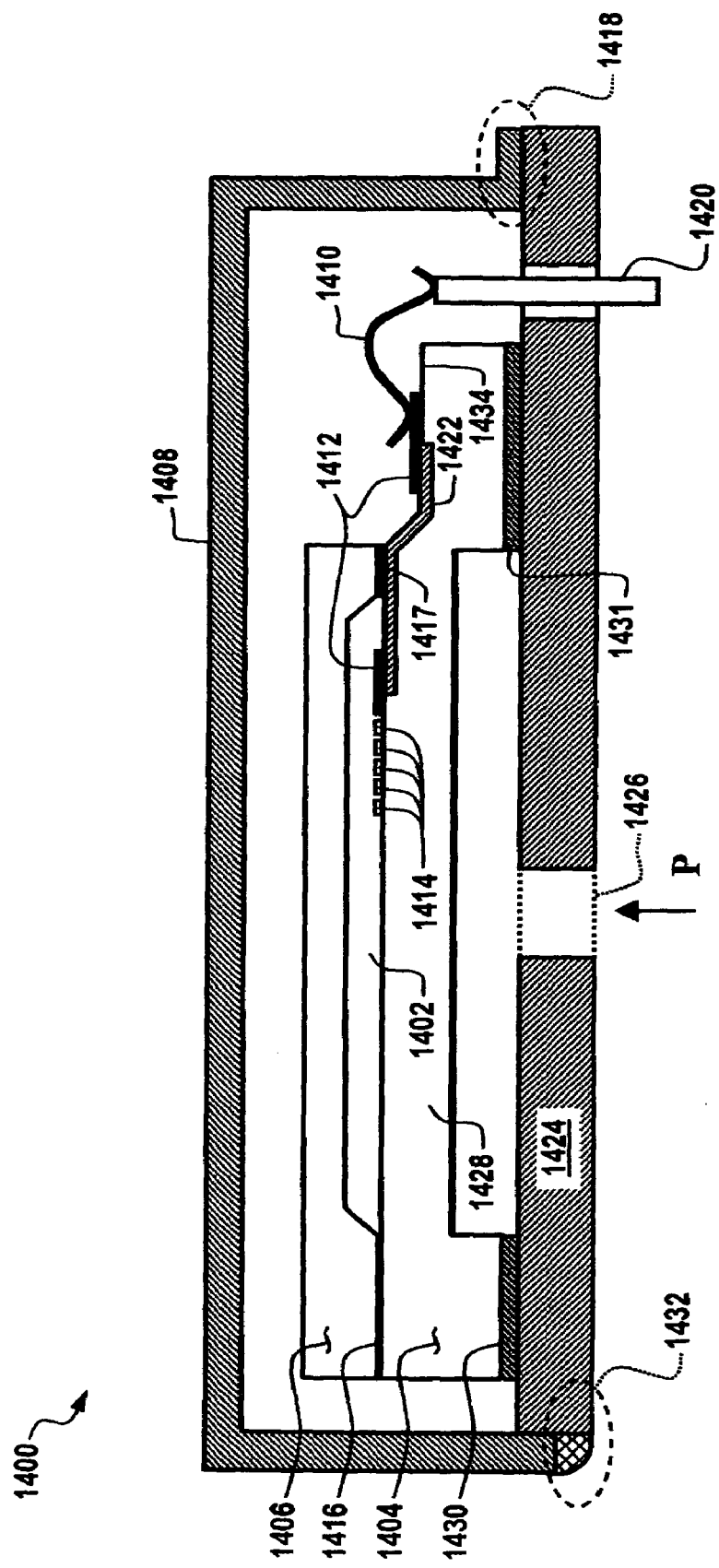
FIG. 14 illustrates a cross-sectional view of a quartz packed SAW pressure sensor, in accordance with an alternative embodiment of the present invention.
Figure 15:
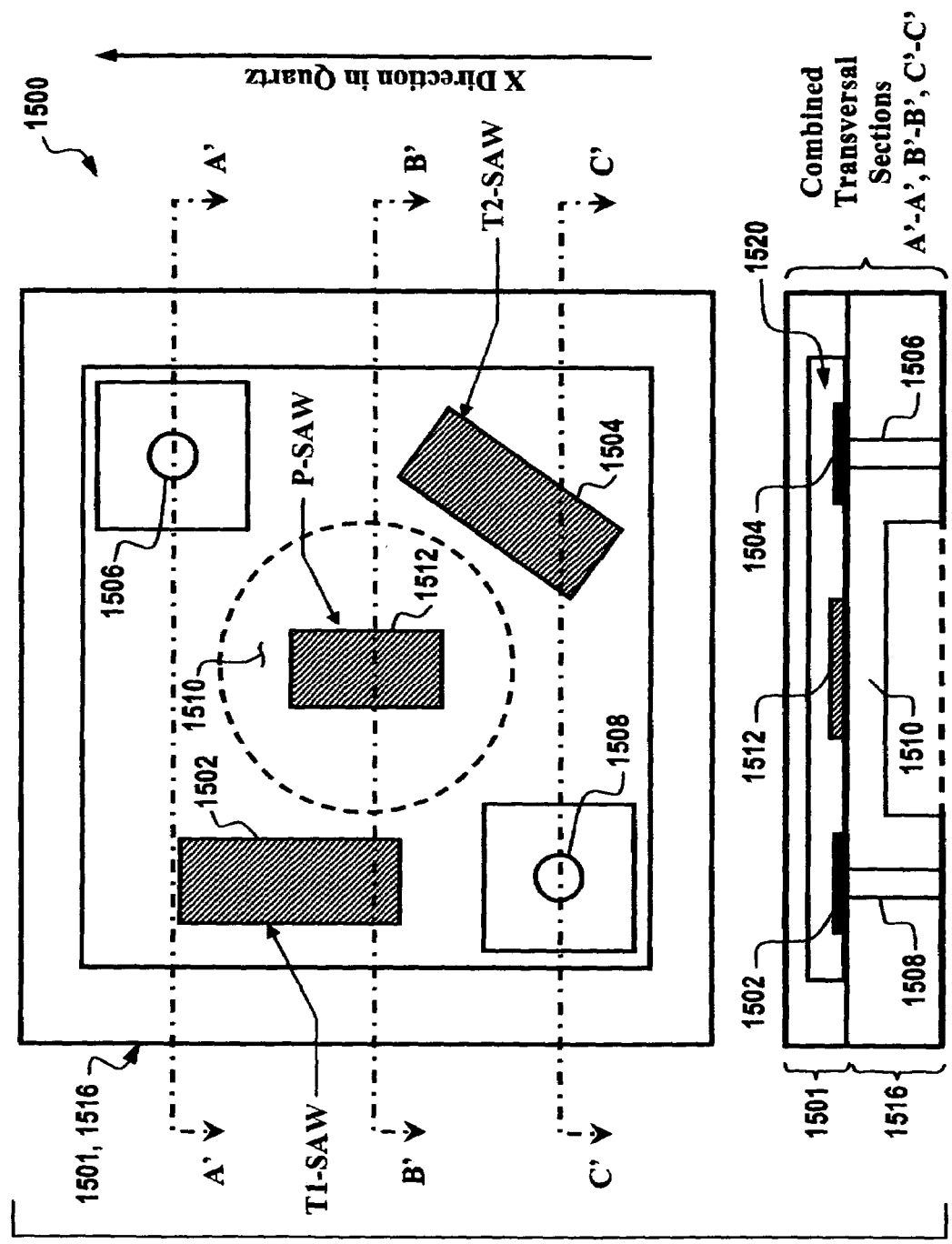
FIG. 15 illustrates a block diagram of a SAW pressure sensor implemented utilizing a micro-machined quartz sensing diaphragm, in accordance with another embodiment of the present invention.

The process indicated above can be applied to a final packaged quartz SAW pressure devices generally depicted in FIGS. 13–15. Thus, in each of the examples illustrated in FIGS. 13–15, a cross-section is depicted through a fully encapsulated TAQP SAW device, in accordance of course, with varying embodiments of the present invention. In the case of high-pressure measurements, for an assumed quartz strength value of 50 MPa, it is generally not necessary to utilize an etched quartz diaphragm. In such a situation, the "starting" quartz wafer can be utilized as a whole such that diaphragm based sensing principles are implemented in the context of TAQP processes for moderate and low pressure operations.

FIG. 13 illustrates a cross-sectional view of a quartz packaged SAW pressure sensor device 1300, in accordance with one embodiment of the present invention. In FIG. 13, the pressure sensing quartz diaphragm can be configured as part of a TAQP process. In the example depicted in FIG. 13, a quartz SAW chip 1306 as a primary package can be implemented with up-side down direct bonded (quartz-to-quartz) features in the zones 1302 and 1303. A quartz base chip 1326 can be configured to include an etched gap 1324 for delimiting the diaphragm. Etched gap 1324 can additionally function as an overpressure stop. A recessed zone 1322 can permits a wire connection to be removed by a dicing process and therefore leave a lateral streak of the quartz SAW chip 1306, as discussed in greater detail herein.

Because the bonding of the chips 1306 and 1326 can be accomplished in a vacuum or at an ambient pressure, the gap 1324 can be function as reference chamber, while the packaged sensor 1300 can be used respectively as an absolute or gauge pressure sensor. The quartz SAW chip 1306 can be configured to include a recessed zone 1338, which permits an electrical contact, by means of a conductive resin 1318, to be located between the two metal layers 1336 deposited both a quartz SAW chip 1306 and quartz base chip 1326. Implanted metal connections such as a titanium implant 1334 can also protrude through the direct bonding 1303 in order to make ohmic contact between the metal connections (e.g., SAW electrodes 1332 and deposited metal 1336) of the quartz SAW chip 1306.

In a secondary package, the assembly of the quartz direct bonded chips 1306 and 1308 can be bonded to package base plate 1320 (i.e., configured from metal or plastic) utilizing a bonding resin 1328 (e.g., silicone PSA, RTV rubber, epoxy and the like). An isolated metallic pin 1316 can protrude through the package base plate 1320 to make contact with a wire connection 1310. A conductive resin 1318 can then be injected from a dispenser for establishing an electrical connection between the two deposited metals layers 1336. Additionally, a protective isolating soft resin 1312 can surround wire connection 1310. An external cover 1308, configured from metal or plastic, generally seals the assembly 1306/1308 and the package base plate 1320.

External cover 1308 can be connected to base plate 1320 by alternative weldings 1330 or 1314 (e.g., laser or electrical welding, resin welding, plastic-to-plastic welding and like). The external package can be configured from metal and/or plastic. A pressure transmitting element 1304 (e.g., air filter, flexible gel) can be located at the air entrance to external cover 1308 in order to prevent contaminants from reaching the backside of the quartz SAW chip. If a hole protrudes through both base chip 1326 and package base plate 1320 in the area of the gap 1324, the packaged sensor 1300 can be utilizing as a differential measurement pressure sensor. Additionally, metallic pin 1316 can be utilized to connect an antenna or another electrical or wireless component, depending upon design needs.

The larger size of the base chip 1326 with respect to the quartz SAW chip 1306 can be obtained during die separation by performing a special dual dicing process in the same direction. The assembly 1306/1326 can be performed at the wafer level by quartz-to-quartz direct bonding. Initially, dicing steps can be performed in order to remove (after the subsequent inter-chip dicing steps) only the upper side steak of the quartz SAW chip 1306 located above a recessed zone 1322 of the quartz base chip 1326. Finally, dicing steps can be performed in perpendicular directions of inter-chip components in order to release the entire quartz direct bonded assembly 1306/1308.

FIG. 14 illustrates a cross-sectional view of a quartz packed SAW pressure sensor device 1400, in accordance with an alternative embodiment of the present invention. Device 1400 generally includes a quartz SAW chip 1404, which can be provided with an etched diaphragm 1428 and a quartz cover 1406 that is directly bonded (quartz-to-quartz) in zones 1416 and 1417 on the up-side of the quartz SAW chip 1404. The quartz cover 1406 can be configured to include an etched gap 1402 that functions as an overpressure stop for the diaphragm 1428. Because the bonding of chips 1406 and 1404 can be accomplished in a vacuum or at an ambient pressure, the gap 1402 can function as a reference chamber. The packaged sensor 1400 can be implemented respectively as an absolute or gauge pressure sensor.

The quartz SAW chip 1404 zone can be configured to include a recessed zone 1434, which permits a wire connection to be made to metal 1412 deposited on the recessed area 1434. After removal by a dicing process, a lateral streak upon the quartz cover 1406 can be located above the recessed area 1434, in the same manner discussed with respect to the embodiment depicted in FIG. 13. A titanium implant can be located on quartz SAW chip 1404 to make contact between the deposited metal 1412, which connects the SAW electrodes 1414, and deposited metal 1412 on the recessed zone 1434. The assembly 1404/1406, performed at the wafer level by quartz-to-quartz direct bonding, and which is also referred as "primary package", can then be bonded to a base plate 1424 (in a "secondary package") via a bonding resin 1430, 1431 (e.g., silicone PSA, RTV rubber, epoxy, and so forth).

A wire connection 1410 generally extends between deposited metal 1412, on the recessed zone, and a metallic pin 1420, which protrudes through a base plate 1424 that can be formed from metal or plastic. A pressure transmitting element 1426 (i.e., air filter located at the air entrance or flexible gel in direct contact with the quartz sensing diaphragm) can be used in the vicinity of the base plate 1424 in order to prevent contaminants from reaching the backside of the quartz SAW chip. Alternative weldings 1418 and 1432 (e.g., laser or electrical welding, resin welding, plastic-to-plastic welding and like) can be utilized to connect base plate 1424 to external cover 1408. Note that external cover 1408 can be formed from metal or plastic.

FIG. 14 therefore presents an alternative solution for SAW sensor technology and packaging, which can be applied for low pressure measurement, wherein an etched quartz diaphragm is necessary. The main advantage of this sensor technology and packaging techniques derives from the fact that the electric contact from the SAW electrodes to the external metallic pin (e.g., pin 1420) can be made much simpler, by utilizing a titanium implant connection between the SAW electrodes to wire bonding pad, both being located on the same quartz piece. Note that if a hole protrudes through both external cover 1408 and quartz cover 1406 in the area of gap 11402, the packaged sensor 1400 can be used as a differential measurement pressure sensor.

FIG. 15 illustrates a block diagram of a SAW pressure sensor package 1500 implemented utilizing a micro-machined quartz sensing diaphragm 1510, in accordance with another embodiment of the present invention. In the alternative embodiment of FIG. 15, through-the-wafer contact holes 1506, 1508 can be utilized for contacting SAW devices, including SAW temperature sensors 1502, 1504 (i.e., T1SAW and T2SAW). In the configuration illustrated in FIG. 15, a pressure SAW sensor 1512 (PSAW or Pres. SAW) can be located on the diaphragm 1510. SAW sensors 1502, 1504 (i.e., T1SAW and T2SAW) are generally located away from diaphragm 1510.

The "primary package" generally: (i) a quartz SAW chip 1516, which can be provided with temperature and pressure SAW sensors 1502, 1504, and 1512, the last being located on the diaphragm 1510, and through-the-wafer contact holes 1506, 1508), and (ii) a quartz cover 1501 provided with an etched gap 1520 that operates as an overpressure stop for the diaphragm 1510, both pieces being bonded by direct quartz-to-quartz bonding technique. Because the bonding of the chips 1501 and 1516 can be accomplished in vacuum or at the ambient pressure, the gap 1520 can function as a reference chamber and the packaged sensor 1500 can be utilized as an absolute or gauge pressure sensor. If a hole protrudes through quartz cover 1501 in the area of the gap 1520, the packaged sensor 1500 can be used as a differential measurement pressure sensor. For a "secondary package" a plurality of sealing variants may be implemented. A very convenient solution, for example, involves simply turning the assembly 1501/1516 upside down and bonding the quartz cover 1501 on a plate base.

In general, for the SAW devices described herein to be used for high pressure measurements (e.g., see FIG. 13), a number of processing steps can be utilized for SAW quartz wafer fabrication. An example of such processing steps are provided below:
1. Micro-roughness evaluation of as-received double-side chemical-polished quartz SAW wafers;
2. Wafer cleaning;
3. Deposition of thin metal layer used as resist mask in next step;
4. Photolithographic process for channel-gap forming, required for metal path to pass from SAW surface to external connection(s);
5. RIE etching of channel-gap;
6. Metal removal;
7. Wafer cleaning;
8. Deposition of the thin film layer utilized as a resist mask for titanium implantation;
9. Photolithographic process for titanium implantation;
10. Titanium implantation for buried conductive paths forming;
11. Deposition of the metal layer used for SAW electrode forming and external contact;
12. Photolithographic process for metal patterning;
13. Metal etching;
14. Wafer cleaning;
15. Hydrophilisation treatment of the quartz SAW wafer in boiled, concentrated $HNO_3$ for 30–50 minutes;
16. Rinsing in Dl water followed by drying;
17. Cleaning in Megasonic RCA 1 solution ($NH_4OH:H_2O_2:H_{20}=1:1:5$) for 10 minutes, followed by $HCl:H_2O_2:H_{20}=1:1:6$ for 10 minutes; and
18. Drying.

Upon completion of the processing steps indicated above, a similar set of processing steps can be implemented upon another quartz wafer to form the quartz base plate. When the two quartz wafers are ready for direct bonding, wafer dicing and chip assembling can be processed, as indicated below:
1. Contact and alignment of the quartz SAW wafer and quartz base plate;
2. Thermal annealing in $N_2$ for 1 hour at T<450° C., wherein the temperature should be ramped up and down with approximately 1° C./min;
3. Bonding control, wherein a "crack opening" method is utilized via a 50 mm blade;
4. Partial wafer dicing (i.e., a cut of thickness equal to the thickness of the quartz SAW wafer, and only in one direction);
5. Entire thickness dicing of the bonded wafers on the inter-chip spaces of the AQP microstructure;
6. Chip bonding with special resin on the package base plate;
7. Dispensing of the conductive resin for metal contacting from both chips;
8. Wire bonding;
9. Dispensing of the protective resin; and
10. Capping and welding.

In a similar manner, the technology for other fabrication solutions of AQP SAW pressure sensors can be described. The quartz wafer could be etched, for example, by wet or dry etching. In an "all-quartz" sensor package, the electrode connections to the antenna could be performed via "through the wafer" connections. In the "through the wafer" design, the "through" holes could be drilled by laser, ultrasound, or wet etching.

The embodiments and examples disclosed herein generally describe an improved mechanical design and simulation method, and a technology for SAW sensor assembly and packaging oriented toward a more integrated fabrication and reduced calibration activity during testing stages. Such technology is based on the mechanical simulation of quartz-made pressure sensing membranes, selective quartz wafer etching for quartz diaphragms, overpressure stop fabrication, metal ion implantation for metal connections and direct quartz-to-quartz wafer bonding for a low-price calibration-free SAW sensor.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A quartz sensor method, comprising the steps of:
   mechanically simulating a plurality of SAW sensing resonators for implementation upon a quartz wafer substrate;
   etching said quartz wafer substrate to produce a plurality of quartz pressure sensing membranes from said quartz wafer substrate; and
   locating a plurality of SAW sensing resonators upon said quartz wafer substrate, which are based upon said plurality of SAW sensing resonators mechanically simulated for implementation upon said substrate to thereby produce a quartz sensor package from said quartz wafer substrate.

2. The method of claim 1 further comprising the step of fabricating an overpressure stop component upon said quartz wafer substrate.

3. The method of claim 1 further comprising the step of implanting metal ions into said quartz wafer substrate for forming of a conductive path connection thereof.

4. The method of claim 3 wherein said metal ions comprise titanium.

5. The method of claim 1 further comprising the step of implementing a quartz-to-quartz wafer bonding operation upon said quartz wafer substrate in order to form said quartz sensor package.

6. The method of claim 1 wherein said plurality of SAW sensing resonators comprises at least one pressure SAW resonator.

7. The method of claim 1 wherein said plurality of SAW sensing resonators comprises at least one temperature SAW resonator.

8. The method of claim 1 wherein said plurality of SAW sensing resonators comprises at least one reference SAW resonator.

9. The method of claim 1 wherein said plurality of SAW sensing resonators comprises at least one pressure SAW resonator partially located on a compressive stress region of said quartz wafer substrate.

10. The method of claim 1 wherein said plurality of SAW sensing resonators comprises at least one pressure SAW resonator.

11. The method of claim 1 wherein said plurality of SAW sensing resonators comprises at least one temperature SAW resonator.

12. The method of claim 1 wherein said plurality of SAW sensing resonators comprises at least one reference SAW resonator.

13. The method of claim 1 wherein said plurality of SAW sensing resonators comprises at least one pressure SAW resonator located partially integral located on a compressive stress region of said quartz diaphragm.

* * * * *